United States Patent
Takayanagi et al.

(10) Patent No.: US 9,997,159 B2
(45) Date of Patent: *Jun. 12, 2018

(54) METHOD AND APPARATUS FOR RECOGNIZING SPEECH BY LIP READING

(71) Applicant: Panasonic Intellectual Property Corporation of America, Torrance, CA (US)

(72) Inventors: Yuichiro Takayanagi, Rancho Palos Verdes, CA (US); Masashi Kusaka, Rancho Palos Verdes, CA (US)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/649,251

(22) Filed: Jul. 13, 2017

(65) Prior Publication Data

US 2017/0309275 A1    Oct. 26, 2017

Related U.S. Application Data

(63) Continuation of application No. 14/826,151, filed on Aug. 13, 2015, now Pat. No. 9,741,342.
(Continued)

(51) Int. Cl.
*G10L 15/25*    (2013.01)
*G10L 15/32*    (2013.01)
(Continued)

(52) U.S. Cl.
CPC ............. *G10L 15/25* (2013.01); *G10L 15/32* (2013.01); *G10L 15/30* (2013.01)

(58) Field of Classification Search
None
See application file for complete search history.

(56) References Cited

U.S. PATENT DOCUMENTS 4,271,499 A  *  6/1981  Leveque ............. H04M 11/064
                                                              370/202
4,587,670 A       5/1986  Levinson
(Continued)

OTHER PUBLICATIONS

"Towards a Practical Lipreading System", authored by Ziheng Zhou, Guoying Zhao and Matti Pietikainen, [database online], [retrieved on Nov. 5, 2014], Retrieved from the Internet: <URL:http://www.researchgate.net/publication/221361770_Towards_a_practical_lipreading_system>.

(Continued)

*Primary Examiner* — Paras D Shah
*Assistant Examiner* — Thuykhanh Le
(74) *Attorney, Agent, or Firm* — Culpepper IP, LLLC; Kerry S. Culpepper

(57) ABSTRACT

A dictation device includes: an audio input device configured to receive a voice utterance including a plurality of words; a video input device configured to receive video of lip motion during the voice utterance; a memory portion; a controller configured according to instructions in the memory portion to generate first data packets including an audio stream representative of the voice utterance and a video stream representative of the lip motion; and a transceiver for sending the first data packets to a server end device and receiving second data packets including combined dictation based upon the audio stream and the video stream from the server end device. In the combined dictation, first dictation generated based upon the audio stream has been corrected by second dictation generated based upon the video stream.

18 Claims, 11 Drawing Sheets

Related U.S. Application Data

(60) Provisional application No. 62/085,243, filed on Nov. 26, 2014.

(51) Int. Cl.
 G10L 19/00 (2013.01)
 G10L 21/00 (2013.01)
 G10L 15/30 (2013.01)

(56) References Cited

U.S. PATENT DOCUMENTS

| | | | |
|---|---|---|---|
| 6,012,027 A | 1/2000 | Bossemeyer, Jr. | |
| 8,442,820 B2 | 5/2013 | Kim | |
| 8,700,392 B1* | 4/2014 | Hart | G10L 15/25 704/231 |
| 9,268,521 B2* | 2/2016 | Nakata | A63F 13/216 |
| 2002/0198710 A1* | 12/2002 | Hernandez-Abrego | G10L 15/10 704/240 |
| 2003/0002726 A1 | 1/2003 | Ozawa | |
| 2003/0165320 A1* | 9/2003 | Ogawa | G11B 20/10 386/279 |
| 2004/0088018 A1* | 5/2004 | Sawchuk | A61N 1/3712 607/27 |
| 2007/0298748 A1* | 12/2007 | Banh | H04B 7/0868 455/296 |
| 2009/0010615 A1* | 1/2009 | Kawahara | G11B 27/105 386/224 |
| 2009/0225791 A1 | 9/2009 | Nagafuji | |
| 2010/0088100 A1* | 4/2010 | Lindahl | G10L 15/30 704/270.1 |
| 2010/0216429 A1 | 8/2010 | Mahajan | |
| 2010/0238286 A1* | 9/2010 | Boghossian | G06K 9/00771 348/143 |
| 2011/0071830 A1* | 3/2011 | Kim | G01C 21/3602 704/246 |
| 2011/0143811 A1* | 6/2011 | Rodriguez | G06K 9/00986 455/556.1 |
| 2011/0208522 A1* | 8/2011 | Pereg | G06F 17/279 704/235 |
| 2011/0222556 A1* | 9/2011 | Shefler | H04N 7/122 370/465 |
| 2012/0084080 A1* | 4/2012 | Konchitsky | G10L 21/0208 704/210 |
| 2012/0239402 A1* | 9/2012 | Washio | G10L 15/02 704/251 |
| 2013/0021459 A1* | 1/2013 | Vasilieff | G10L 25/78 348/77 |
| 2013/0096918 A1* | 4/2013 | Harada | G10L 15/19 704/251 |
| 2013/0158977 A1* | 6/2013 | Senior | G06F 17/27 704/9 |
| 2014/0010418 A1 | 1/2014 | Dey | |
| 2014/0223272 A1 | 8/2014 | Arora | |
| 2014/0278393 A1* | 9/2014 | Ivanov | G10L 15/20 704/233 |
| 2015/0049191 A1* | 2/2015 | Scalisi | H04M 1/0291 348/143 |
| 2015/0086175 A1* | 3/2015 | Lorenzetti | H04N 9/8211 386/226 |
| 2015/0127340 A1* | 5/2015 | Epshteyn | G10L 15/26 704/235 |
| 2015/0149169 A1* | 5/2015 | Chang | H04R 25/55 704/235 |
| 2015/0154953 A1* | 6/2015 | Bapat | G10L 15/06 704/251 |
| 2015/0154983 A1 | 6/2015 | VanBlon | |
| 2015/0326949 A1* | 11/2015 | Burton | H04N 21/4316 704/235 |
| 2015/0364140 A1* | 12/2015 | Thorn | G06F 17/24 704/235 |
| 2015/0371630 A1* | 12/2015 | Koyama | G10L 25/60 704/249 |
| 2016/0057179 A1* | 2/2016 | Volach | H04L 65/1069 370/261 |
| 2016/0063990 A1 | 3/2016 | Nelson | |
| 2017/0061935 A1* | 3/2017 | Rummel | G09G 5/00 |

OTHER PUBLICATIONS

"Towards a Visual Speech Learning System for the Deaf by Matching Dynamic Lip Shapes", authored by Shizhi Chen, D. Michael Quintian, and Yingli Tian, [database online], [retrieved on Aug. 13, 2015], Retrieved from the Internet: <URL:http://www-ee.ccny.cuny.edu/wwwn/yltian/Publications/ICCHP12_lipRead.pdf>.

"Lipreading With Local Spatiotemporal Descriptors", authored by Guoying Zhao, Mark Barnard, and Matti Pietikainen, Aug. 18, 2009, IEEE Transactions on Multimedia, vol. 11, No. 7.

* cited by examiner

METHOD AND APPARATUS FOR RECOGNIZING SPEECH BY LIP READING

CROSS-REFERENCE TO RELATED APPLICATIONS

The present application is a continuation of U.S. patent application Ser. No. 14/826,151 filed on Aug. 13, 2015, which claims the benefit of U.S. provisional application No. 62/085,243 filed on Nov. 26, 2014.

TECHNICAL FIELD

The technical field relates generally to a dictation device, server end device and system for performing speech recognition based upon audio and video signals.

BACKGROUND

Audio based speech recognition services such as, for example, Dragon Dictation, Ski, and SILVIA, can transcribe audio signals including voice data representing speech into text to be rendered on a display. On the other hand, image based speech recognition services transcribe speech into words by, for example, recognizing lip motion. In one such approach, a local binary pattern (LBP) of a series of images in video of lip motion is recognized as text by comparison to a database. However, extracting the LBP from a video can consume a great amount of processing and memory resources. Both types of speech recognition services will be referred to here as speech-to-text services.

SUMMARY

Although the capability and competence of speech-to-text services have recently improved, such services may still have a prevalent error rate. Using common evaluation measures such as the word error rate and sentence error rate, commonly used audio based speech recognition services have at times demonstrated error rates as high as 18% for words and 85% for sentences. Image based speech recognition services such as lip reading have demonstrated a lower error rate. However, in subject independent (SI) lip reading services, errors can occur due to large variations within lip shapes, skin textures around the mouth, varying speaking speeds and different accents, which could significantly affect the spatiotemporal appearances of a speaking mouth. A recent SI lip reading algorithm developed by Zhou et al. can reportedly achieve recognition rates as high as 92.8% (See "Towards a Practical Lipreading System", authored by ZIHENG ZHOU, GUOYING ZHAO and MATTI PIETIKAINEN, [database online], [retrieved on Nov. 5, 2014], Retrieved from the Internet: <URL:http://www.researchgate.net/publication/221361770_Towards_a_practical_lipreading_system>, the contents of which are incorporated herein by reference). However, even this algorithm requires the video to have at least 9 frames. Thus, the processing and memory resources consumed can be high. Subject dependent (SD) lip reading services require the user to input a training sample size so that the service can "learn" the user's unique characteristics. Therefore, SD lip reading services are considered user unfriendly.

In view of the above problems, as well as other concerns, the present disclosure concerns various embodiments of a dictation device, a server end device, a system including the dictation device and the server end device, and methods which can perform speech-to-text services at a lower error rate in a user friendly manner.

A method for generating text from speech according to one embodiment includes: receiving an audio signal representing a voice utterance of one or more words; performing an audio based speech recognition algorithm to convert the voice utterance into first dictation; determining if each of the one or more words has a predetermined characteristic; and performing a video based speech recognition algorithm to convert a portion of a video signal representing lip motion associated with the voice utterance associated with the word determined to have the predetermined characteristic into second dictation.

The predetermined characteristic can be the word in the first dictation has less than a predetermined number of syllables or the word is less than a predetermined length or time duration.

Determining if each of the words has the predetermined characteristic can further include determining for each of a plurality of prototype candidate words a probability that the respective prototype candidate word can be generated by a feature signal associated with the portion of the audio signal corresponding to the word. In this case, the predetermined characteristic can be that none of the plurality of prototype candidate words have a determined probability higher than a predetermined standard.

The performing a video based speech recognition algorithm to convert the portion of the video signal into second dictation can further include receiving a portion of the video signal that is synchronized with the portion of the audio signal including the word determined to have the predetermined characteristic.

The determining if each of the one or more words has a predetermined characteristic can include comparing each of the words in the first dictation to the corresponding word in the second dictation. In this case, the predetermined characteristic can be that the word in the first dictation is different from the corresponding word in the second dictation.

One embodiment of a system for generating text from speech includes a dictation device such as a smartphone and a server and/or server end devices. All of the server and server end devices will be referred to here as a server end device for simplicity. The smartphone and server end device can execute a software application stored locally or on a remote server.

In one embodiment, the dictation device includes: an audio input device configured to receive a voice utterance including a plurality of words; a video input device configured to receive video of lip motion during the voice utterance; a memory portion; a controller configured according to instructions in the memory portion to generate first data packets including an audio stream representative of the voice utterance and a video stream representative of the lip motion; and a transceiver for sending the first data packets to the server end device (a remote apparatus) and receiving second data packets including combined dictation based upon the audio stream and the video stream from the server end device. In the combined dictation, first dictation generated based upon the audio stream has been corrected by second dictation generated based upon the video stream. The controller can be further be configured to render the combined dictation as text on a display. The controller can further configured to generate synchronization data to synchronize the audio stream and the video stream to be sent by the transceiver to the server end device. The transceiver can be further configured to send the second data packets to a downstream application such as an Internet website or other hardware such as a television or home appliance. The dictation device can be, for example, a smartphone.

In one embodiment, the server end device includes: a transceiver configured to send and receive data packets to a remote mobile station (the dictation device) via a connection to a network; an interface for adding formatting information to data to generate the data packets to be sent and removing formatting information from received data packets, the received data packets including an audio stream and a video stream associated with a voice utterance of a plurality of words; a controller coupled to the interface; an audio based speech recognition module coupled to the controller and configured to generate first dictation based upon the audio stream received from the remote mobile station; a video based speech recognition module coupled to the controller and configured to generate second dictation based upon the video stream received from the remote mobile station; and a memory including instructions for configuring the controller to generate a combined dictation based upon a comparison between the first dictation and the second dictation.

The controller can be configured to determine if at least one of the words in the first dictation has a predetermined characteristic. The combined dictation can be generated based upon the second dictation for the at least one of the words having the predetermined characteristic and based upon the first dictation for the other of the plurality of words.

The predetermined characteristic can be that at least one word is not similar to the corresponding at least one word in the second dictation, that the at least one word has less than a predetermined number of syllables or that the at least one word is determined to be less than a predetermined length or time duration.

The audio based speech recognition module can generate the first dictation by: extracting a feature signal associated with the audio stream; for each of a plurality of candidate prototype words, determining the probability that the respective candidate prototype word generates the feature signal; and choosing the candidate prototype word having highest probability among the plurality of candidate prototype words.

The video based speech recognition module can generate the second dictation by generating a feature signal parameter sequence such as a LBP from the sequence of image frames in the video stream; matching the feature signal vector to a stored feature signal parameter sequence; determining the probability of each of a plurality of candidate prototype words generating the stored feature vector; and selecting the candidate prototype word of the highest probability as the text in the second dictation.

The audio based speech recognition module and video based speech recognition can be two separate processors included in two separate computing devices configured according to instructions in memory. Alternatively, the modules can be a processor in a single computing device configured according to instructions in memory. In both cases, the computing device(s) will be connected to the controller. Alternatively, the controller can be configured by instruction in memory to perform audio based and video based speech recognition.

The controller can be further configured to obtain synchronization data indicating a portion of the video signal that is synchronized with the portion of the audio signal including the words determined to have the predetermined characteristic. Particularly, according to one aspect, the audio stream and video stream in the received data packets can be in the transport or program stream format associated with the various MPEG format. The transport or program stream includes synchronization data for synchronizing the audio with video for playback.

According to another embodiment, a dictation device includes: an audio input device that receives an audio signal representing user voice; a video input device that receives a video signal representative of lip movement associated with the user voice; and a controller configured according to instructions stored in a memory. The controller is configured to: generate a first dictation based on the audio signal and assign a first conversion value based on a first set of conversion criteria; generate a second dictation based on the video data and assign a second conversion value based on a second set of conversion criteria; and generate a variable text conversion value based on the first conversion value and the second conversion value and generate a third dictation based on the variable text conversion value.

According to a first aspect, the controller generates the variable text conversion value based on said first conversion value when a number of syllables in a word is greater than N and based on said second conversion value when the number of syllable is N or less.

According to a second aspect, the controller generates the variable text conversion value based on said second conversion value during a period when a length of syllable of a word is less than M.

According to a third aspect, the audio input device is disabled when a signal to noise ratio between the audio signal and a background noise is below a predetermined threshold.

According to a fourth aspect, the video input device is disabled when a signal to brightness ratio is below a predetermined threshold.

According to a fifth aspect, if the volume of the audio signal is lower than a predetermined value, the controller generates the variable text conversion value without the first conversion value.

According to a sixth aspect, when video input device detects no lip movement, the audio input device is disabled.

According to a seventh aspect, said controller generates a text conversion value based on said first conversion value, said second conversion value and global positioning system (GPS) data. The first set of conversion criteria can include pre-registered data representing a value associated with the user voice. The second set of conversion criteria can include pre-registered data representing a value associated with the user voice.

According to an eighth aspect, the variable text conversion value is generated based on a predetermined criteria which includes pre-registered data representing a value of the user voice.

According to a ninth aspect, the controller is configured to prioritize either the first conversion value or the second conversion value by a predetermined setting.

According to a tenth aspect, the predetermined setting can be assigned by a user.

BRIEF DESCRIPTION OF THE DRAWINGS

The accompanying figures, in which like reference numerals refer to identical or functionally similar elements, together with the detailed description below are incorporated in and form part of the specification and serve to further illustrate various exemplary embodiments and explain various principles and advantages in accordance with the present invention.

DETAILED DESCRIPTION

Figure 1A:
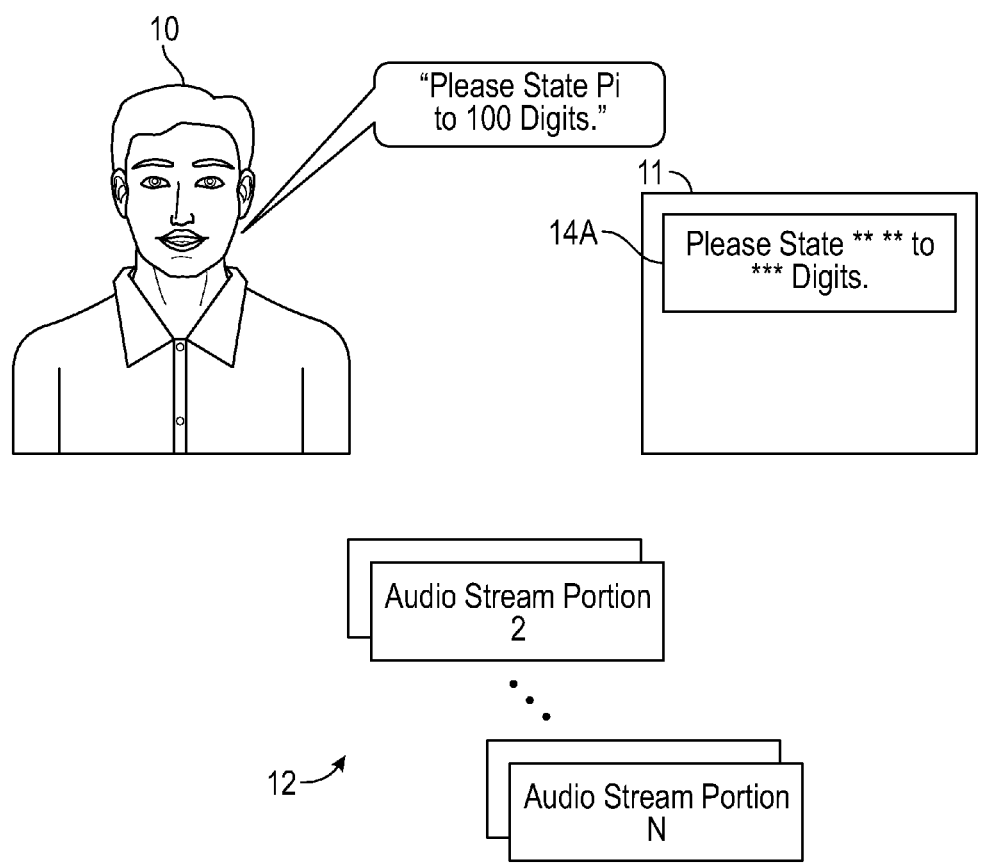
FIGS. 1A-1B are diagrams illustrating exemplary operations of a dictation device.

In overview, the present disclosure concerns a system including a dictation device for performing speech-to-text services and a server end device. The dictation device may be a mobile station such as, for example, a smart phone, a portable computer or an in-vehicle user apparatus. The server end device can be a server or one or more apparatus connected to the server or a combination of both communicating with the mobile station. Either combination of the server and one or more apparatus connected to the server will be referred to here as a server end device for simplicity.

The present disclosure also concerns processors for the mobile station and server end device, memories associated with the processors, and computer readable instructions stored in the memories for configuring the processors. More particularly, various inventive concepts and principles are embodied in systems, apparatuses, and methods for configuring a mobile station to be able to provide more accurate and user friendly speech-to-text recognition services.

The instant disclosure is provided to further explain in an enabling fashion the best modes of performing one or more embodiments of the present invention. The use of relational terms such as first and second, top and bottom, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and the inventive principles when implemented, are best supported with or in computer program instructions (software) or integrated circuits (ICs), and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

The computer program instructions can be provided to a processor of a general purpose computer, special purpose computer, or other programmable data processing apparatus to produce a machine, such that the instructions, which suitably execute via the processor of the computer or other programmable data processing apparatus, create means for implementing the functions specified in block diagrams or flowchart steps discussed below. The computer program instructions may also be stored in a computer usable or computer-readable non-transitory memory that can suitably direct a computer or other programmable data processing apparatus to function in a particular manner, such that the instructions stored in the memory produce an article of manufacture, preferably including instruction means that suitably implement the function specified in the flowchart block or blocks.

Further, in certain preferred embodiments, the portions may be modules implemented by a software or hardware component, such as a field programmable gate-array (FPGA) or application-specific integrated circuit (ASIC), which performs certain tasks. Preferably, a module may preferably be configured to reside on an addressable storage medium and preferably be configured to execute on one or more processors. Accordingly, in further preferred embodiments, an exemplary module may preferably include, but may not be limited only to, components, such as software components, object-oriented software components, class components and task components, processes, functions, attributes, procedures, subroutines, segments of program code, drivers, firmware, microcode, circuitry, data, databases, data structures, tables, arrays, and variables. Preferably, the functionality provided for in the components and modules may be suitably combined into fewer components and modules or further separated into additional components and modules.

Referring to the diagrams of FIGS. 1A-1B, an exemplary operation of a dictation device 11 for performing speech-to-text will be discussed. The dictation device 11 may be implemented within a mobile station such as a smartphone. Referring first to FIG. 1A, a problem associated with an audio speech-to-text service will be discussed. A user 10 of the dictation device 11 inputs a voice utterance into an audio input device such as, for example, a microphone associated with the dictation device 11. In this example, the spoken voice utterance is "Please state Pi up to 100 digits." The voice utterance is converted into an audio stream 12 that includes a number of portions (N). Each of the N portions may be, for example, an audio frame of predetermined time duration (t) such as, for example, 45 ms. Alternatively, or in combination with the time duration t, each audio frame may represent a certain predetermined number of syllables, words or phoneme. An audio based speech recognition service is used to transcribe the speech into text, which is rendered on the display 14A associated with the dictation device 11. However, the audio based speech recognition service fails to accurately transcribe the words "Pi" and "one hundred".

Figure 1B:
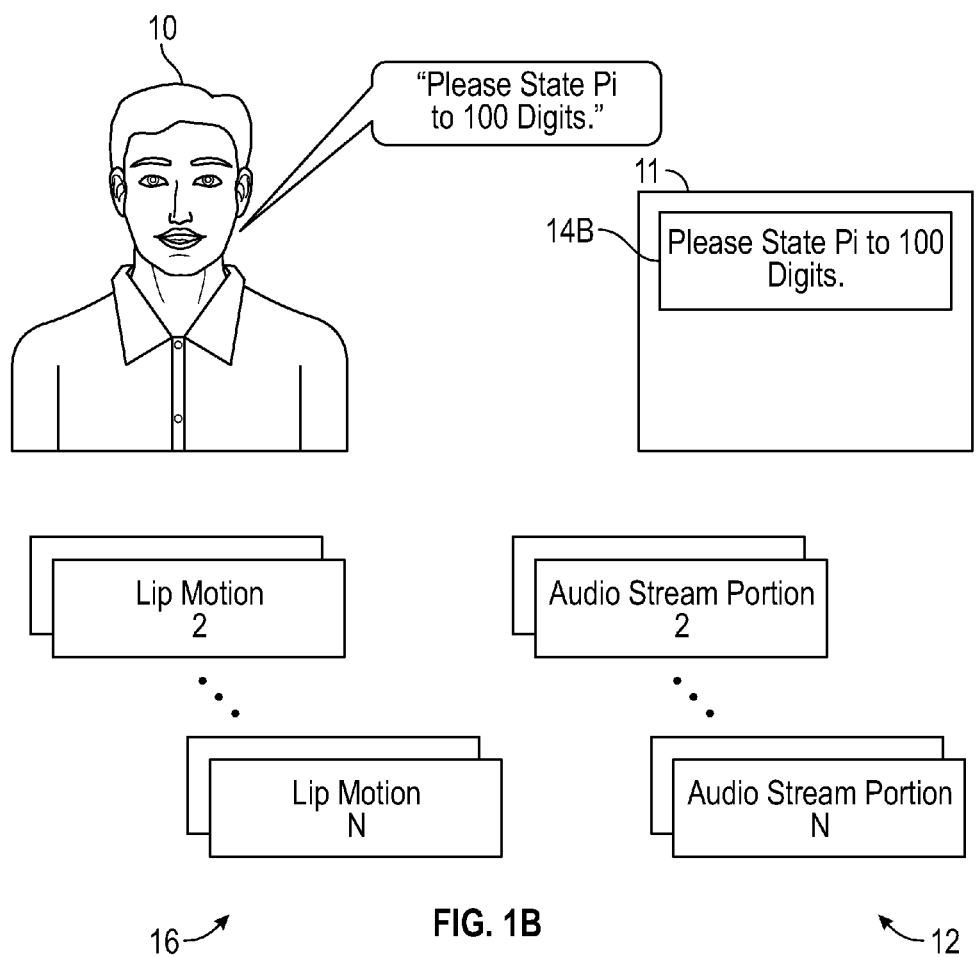

As shown in FIG. 1B, in the dictation device 11 according to various exemplary embodiments, when a user 10 of the dictation device 11 speaks into an audio input device such as, for example, a microphone associated with the mobile station, not only is the input speech converted into the audio stream 12, but video including a series of images of lip motion of the user 10 is also recorded and converted into a video stream 16 that includes N portions. The N portions may be image frames. Also, the number N of image frames can be different from the number N of audio frames.

Figure 1C:
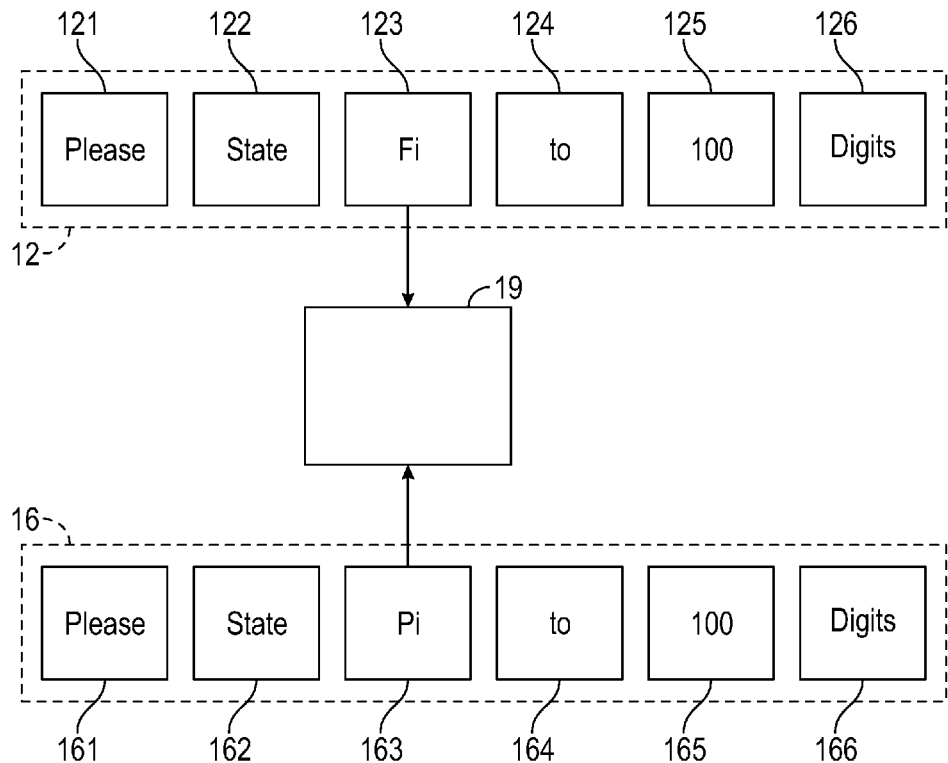
FIG. 1C is a schematic diagram illustrating first and second dictations generated by the dictation device.

As shown in FIG. 1C, the audio stream 12 and the video stream 16 are converted into first and second dictations textually representing the plurality of words in the utterance.

The dictation device 11 can recognize that certain words such as "Pi" and "one hundred" are not likely to be transcribed accurately by the audio based speech recognition service in accordance with a predetermined criteria or characteristic. However, the second dictation obtained from the video stream by video based speech recognition (lip reading) can be used to correct such words. Thus, the words "Pi" and "one hundred" are accurately transcribed into combined dictation and rendered in the display 14B. The transcribed text can then be input into another downstream application for, for example, displaying Pi to 100 digits as requested. In one embodiment discussed more fully below, the predetermined criteria can be that a comparison 19 is performed for each of the word (such as word 123) in the first dictation to determine if it is different from the corresponding word (such as word 163) in the second dictation.

As discussed with respect to the block diagrams below, the dictation device 11 can be implemented by a mobile station such as a smartphone which includes a video camera and/or microphone for recording the user's voice utterances and lip movement. The mobile station can also include one or more processors configured to perform the audio and video based speech recognition.

Figure 2:
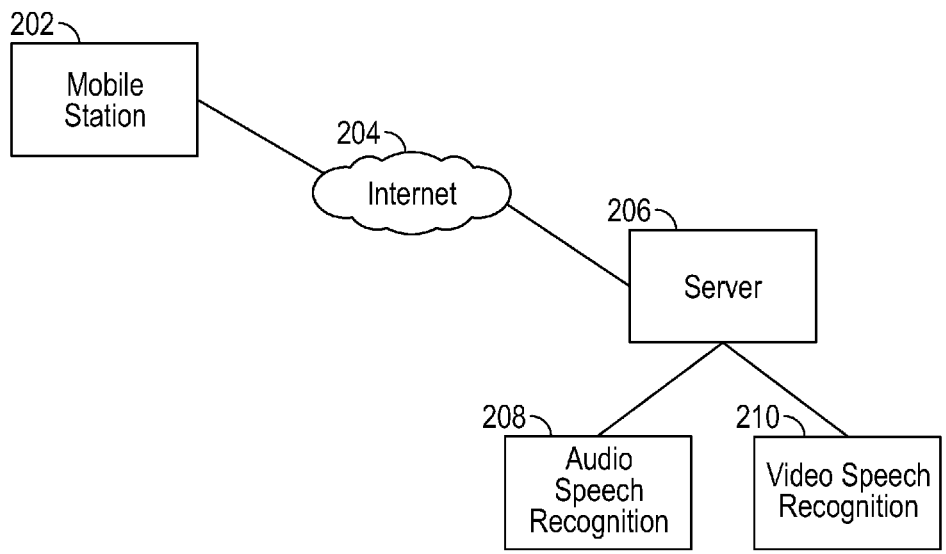
FIG. 2 is a schematic diagram illustrating exemplary simplified and representative operating environment of as system in which a mobile station communicates with a server via the Internet.

As shown in FIG. 2, the system can be implemented by a plurality of distributed devices such as a mobile station 202, a server 206 and server end modules 208, 210. This system will be referred to as a distributed device format. The mobile station 202 generates audio and video streams of the voice utterances and lip movement of the user and transmits the streams to the server 206 via a network such as, for example, the Internet 204. The server 206 utilizes the server end module 208 depicted as "Audio Speech recognition" to perform audio based speech-to-text recognition and the server end module 210 depicted as "Video Speech recognition" to perform video based speech recognition. Although each of the server end modules 208, 210 are shown as separate modules and connected to the server 206, it should be noted that the server end modules 208, 210 may be a portion of the server 206. Further, one server end module may perform both audio and speech based recognition. Also, the server end module(s) may be connected to the server 206 via the Internet 204 and/or via another server not shown. Moreover, the server end module(s) may utilize online databases of common feature patterns in order to recognize certain words.

Figure 3:
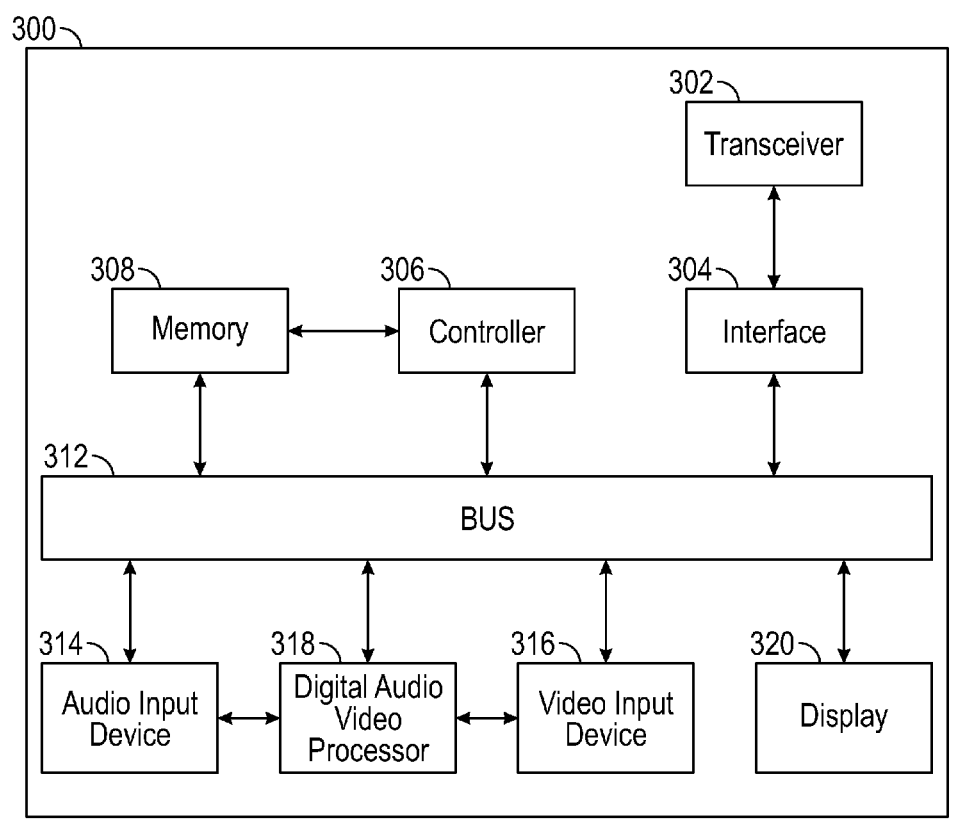
FIG. 3 is a block diagram of exemplary portions of a dictation device according to exemplary embodiments.

Referring to the block diagram of FIG. 3, portions of an exemplary mobile station 300 implementing the dictation device will be discussed. The mobile station 300 can include a transceiver 302, an interface 304, a controller 306, a memory 308, an audio input device 314, a video input device 316, a digital and audio video processor 318, a display 320, and a common bus 312.

Referencing the Open Systems Interconnection reference model (OSI model), the transceiver 302 provides the physical layer functions such as modulating packet bits into electromagnetic waves to be transmitted and demodulating received waves into packet bits to be processed by higher layers. The transceiver 302 can include radio technology circuitry such as, for example, ZigBee, Bluetooth and WiFi. The transceiver 302 may also include Ethernet and a USB connection. Further, the transceiver 302 can include an antenna portion capable of receiving and transmitting the electromagnetic waves from and to, for example, an access point of the mobile station. The antenna portion can also be separate from the transceiver 302. The antenna portion can include, for example, an RF antenna, a coil antenna and/or a capacitive plate antenna.

The interface 304 can provide the data link layer and network layer functions of the mobile station 300 such as formatting the packet bits to an appropriate format for transmission by the transceiver 302 or received packet bits into an appropriate format for processing by the controller 306. For example, the interface 304 can be configured in accordance with the 802.11 media access control (MAC) protocol and the TCP/IP protocol. According to the MAC protocol, packet bits are encapsulated into frames for transmission and the encapsulation is removed from received frames. According to the TCP/IP protocol, error control is introduced and addressing to ensure end to end delivery. Although shown separately here for simplicity, it should be noted that both the interface 304 and the transceiver 302 may be implemented by a network interface consisting of a few integrated circuits.

The memory 308 can be one or a combination of a variety of types of memory or computer readable medium such as random access memory (RAM), read only memory (ROM), flash memory, dynamic RAM (DRAM), hard disk drive (HDD) or any type of non-transitory memory. The memory 308 generally includes instructions for configuring the controller 306 as well as a basic operating system, executable code, and data and variables.

The bus 312 is a common bus for providing communications between the portions of the mobile station 300 with the controller 306.

The display 320 can be a conventional liquid-crystal display unit for displaying transcribed text.

The audio input device 314 can include a microphone internal to the mobile station 300 and/or a connection for an external microphone and a processor for processing the sound signal.

The video input device 316 can include a video camera or be coupled to a video camera external to the mobile station 300 to generate digital video. In a case in which the device 316 includes the video camera, the video input device 316 can include a CCD image sensor that generates image information by capturing a subject image formed through a lens tube. Light from the subject that becomes an object to be captured passes through the lens tube and then forms an image on the light reception surface of the CCD image sensor. The formed subject image can be converted into R, G, or B color information. As a result of the conversion, image information that indicates an entire subject image is generated. The CCD image sensor can generate image information of a new frame at each constant time. The video input device 316 can include an 8 megapixel iSight camera having 1.5 micron pixels, 1.2 megapixel photos and capability to capture 1080p HD at 60 fps.

The digital audio/video processor 318 can perform conversion between analog and digital and other necessary processing before storing the digital audio and video data in the memory 308 or an external storage medium or memory as an audio stream and video stream.

The controller 306 is the main processing unit for sending control signals and exchanging data with the other portions of the mobile station 300 via, for example, the bus 312.

The controller 306 can be a general purpose CPU or an application specific integrated circuit (ASIC). The memory 308 and controller 306 can be part of the ASIC. For example, if the mobile station 300 is a smartphone, the controller 306, memory 308, bus 312, interface 304 and digital audio video processor 318 will likely be integrated onto a single chip set, referred to as a system on chip (SoC), including a quad-core or dual-core CPU.

It should be noted that the controller 306 can be alternatively configured to perform the A/D conversion, etc. so that the digital audio/video processor 318 can be eliminated.

In the distributed device format, the mobile station 300 can only perform some of the necessary steps of the speech-to-text services. Particularly, the mobile station 202 generates the voice and video streams while the speech-to-text recognition is performed by the server and/or server end modules. Particularly, as shown in FIG. 2, a server 206 is connected to or includes one or more modules 208, 210 for performing audio and video based speech recognition. The mobile station 202 can exchange data with the server 206 via a connection to the Internet 204. Particularly, the mobile station 202 can send first data packets including an audio stream representative of the voice utterance and a video stream representative of the lip motion to the server 206. The mobile station 202 can receive second data packets including combined dictation based upon the audio stream and the video stream from the server 206.

In an alternative embodiment referred to here as the single device format, the mobile station 300 can perform all of the speech-to-text services. In such a case the controller 306 can be configured by the instructions in the memory 308 to perform audio based speech recognition and/or video based speech recognition in accordance with the discussion of the audio based recognition module and the lip reading based recognition module below with reference to FIG. 4 and to perform the routines discussed below with reference to the flow diagrams of FIGS. 5A-7.

A combination of the single device and distributed device format is also possible. For example, the mobile station 300 can include the capability to perform all of the speech-to-text services, but can choose to use more powerful resources available from the server 206 depending on the quality of the connection to the network.

Figure 4:
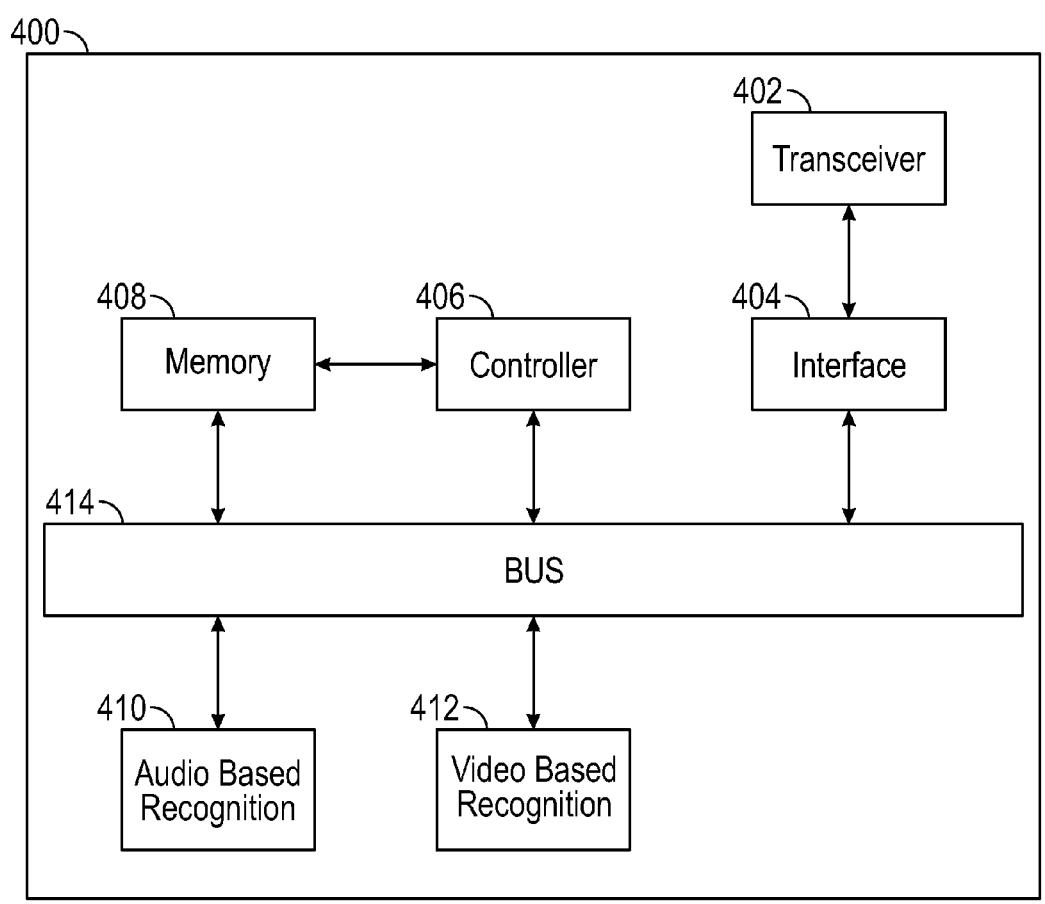
FIG. 4 is a block diagram of exemplary portions of a server end device according to exemplary embodiments.

Referring to the block diagram of FIG. 4, the one or more modules for performing audio speech and video speech recognition and the server are depicted by server end device 400.

The server end device 400 can include a transceiver 402, an interface 404, a controller 406, a memory 408, an audio (speech-to-text) recognition module 410, a video (lip reading) recognition module 412, and a common bus 414.

Similarly to the transceiver and interface of the mobile station, the transceiver 402 of the server end device 400 provides the physical layer functions and the interface 404 provides the data link layer and network layer functions. Although shown separately here for simplicity, it should be noted that both the interface 402 and the transceiver 404 may be implemented by a network interface consisting of a few integrated circuits.

The memory 408 can be one or a combination of a variety of types of memory or computer readable medium such as RAM, ROM, DRAM, HDD or any type of non-transitory memory. The memory 408 includes instructions for configuring the controller 406 as well as a basic operating system, executable code, and data and variables.

The memory 408 may include: (1) predetermined feature signals (e.g, sets of acoustic feature vector signals for audio streams and LBP features for video streams); (2) reference patterns representative of identified words or phrases of a vocabulary set; (3) one or more recognition criteria for comparing feature signals of voice stream and video stream portions to the reference patterns; and (4) pre-registered data representing a value associated with the user voice. For example, one recognition criteria may be a hidden Markov model for each reference pattern.

The controller 406 is the main processing unit for sending control signals and exchanging data with the other portions via, for example, the bus 414. For example, the controller 406 can receive first and second dictations from the modules 410, 412 via bus 414. The modules 410, 412 can receive the audio and video streams in the data packets from the interface 404 via bus 414.

The controller 406 can be configured by the instructions in the memory 408 to perform audio based speech recognition and/or video based speech recognition in accordance with a routine discussed below with reference to FIGS. 5A-5B, 6 and 7.

The bus 414 is a common bus for providing communications between the portions of the server end device 400 with the controller 406.

The audio based recognition module 410 and the video based recognition module 412 can include one or more processors configured according to instructions stored in, for example, the memory 408 for performing an audio based speech recognition algorithm to convert the audio stream into first dictation a video based speech recognition algorithm and to convert the video stream into second dictation. Although shown separately, both modules 410, 412 can alternatively be implemented by the controller 406. Generally, both modules 410 and 412 can perform dictation by generating a feature signal from the audio and video stream, matching the feature signal to predetermined feature signal vectors, determining a probability of the predetermined feature signal vector being generated by a reference pattern model for a word or phrase and selecting the word associated with a highest probability. As discussed above, the reference pattern models and predetermined feature signals can be stored in the memory 408. For example, for SD recognition, the reference pattern models and/or predetermined feature signals may have been generated based upon a user speaking a training sequence. However, the modules 410, 412 can alternatively be configured to refer to databases on other devices via a connection to, for example, the Internet in order to achieve more robust speech recognition.

For example, for audio based recognition, the algorithm can be, for example, a Hidden Markov Model Speech Recognition Arrangement algorithm as discussed in, for example, U.S. Pat. No. 4,587,670 to Levinson et al, the contents of which are incorporated by reference. In such as case, the module 410 can be configured to group the audio stream digitally representing the voice input into successive overlapping frames of predetermined time duration such as, for example, 45 ms. The module 410 generates a time frame sequence of acoustic feature signals such as linear prediction coefficient (LPC) vectors from each frame. The module 410 can also be configured to determine the endpoint of the input speech pattern based upon energy of the feature signal sequence. The module 410 compares the generated feature signals to feature signals stored in memory 408 (or in another device such as an online database) and selects the closest corresponding stored feature signal feature for each speech pattern feature signal as a vector quantized feature signal for every successive frame of the speech pattern. The closest corresponding stored feature signal can be determined based upon the Itakura distance metric signal. Each of the quantized feature signals is one of a finite set of M symbols that may be input to hidden Markov model processing. The module 410 can then determine a probability that a sequence was generated by the reference pattern model. Particularly, referring to the quantized LPC vector feature sequence for an utterance as the sequence O, the probability that the sequence O was generated by a reference pattern model K (a word of a vocabulary set) can be determined in accordance with following Formula (1):

$$P(O|M) = P_{i1} b_{i1}(O_1) a_{i1 i2} b_{i2}(O_2) \ldots a_{iT-1} b_{iT}(O_T) \quad (1)$$

where $i_1, i_2, \ldots i_T$ is the maximum likelihood sequence of Markov model states and $O_1, O_2, \ldots, O_T$ is the observed sequence.

After the probability signal for each reference pattern model has been generated, the input speech pattern may be identified as the reference pattern model corresponding to the highest probability signal.

The video based recognition module 412 can be configured to group the digital video stream representing the lip motion into a sequence of successive overlapping image frames of 45 ms duration. In each image frame, the mouth region is preferably cropped off from the face. Similarly to the text to speech recognition process, feature signals re generated by being extracted from the sequence of image frames.

For example, a feature signal can be generated from LBP texture descriptors extracted from the sequence of image frames when analyzed in the XYT space. Here XY stands for the image plane and T for temporal positions of individual frames. In this approach, the movement of a talking mouth is considered as a continuous process, and the speech video is viewed as a set of images sampled at a fixed rate along a curve representing the voice utterance in the space of the visual features extracted from the images.

The module 412 can then identify a reference pattern similar to the process for voice recognition. Particularly, the module 412 can compare the generated feature signals to feature signals stored in memory 408 (or in another device such as an online database) and selects the closest corresponding stored feature signal feature for each lip motion feature signal as a vector for every successive frame. The module 412 can then determine a probability that a sequence was generated by the reference pattern model.

After the probability signal for each reference pattern model has been generated, the input speech pattern may be identified as the reference pattern model corresponding to the highest probability signal. The probability can be determined by a dynamic Bayesian network (DBN) model or a hidden Markov model.

As a result of the comparison, the unknown speech pattern is identified as the closest matching reference pattern in accordance with predetermined recognition criteria. The accuracy of such recognition systems is highly dependent on the selected features and the recognition criteria.

The server end device 400 and the mobile station 300 can communicate with each other by exchanging data within, for example, media access control (MAC) frame messages in accordance with the message format defined by IEE Std. 802.11. Each frame includes a MAC header, a frame body and a frame check sequence (FCS). The header can include frame control, duration, address, optional sequence control, information, optional quality of service control information, and optional control fields. The frame body can be a variable-length frame body and contains information specific to the frame type and subtype. The FCS can include an IEEE 32-bit CRC. The frame body of the messages from the mobile station 300 can include the video and audio streams. The frame body of the messages from the server end device 400 can include the transcribed text. The header can indicate if the message is a control, data or management frame.

The mobile station 300 can send the audio and video stream to the server end device 400 in a predetermined data stream format such as a Moving Picture Experts Group (MPEG) data stream (program stream, transport stream, etc.). Preferably, the format is sufficient for recognition of synchronization of time of the video stream and audio stream. Particularly, returning to FIGS. 1B-1C, it is preferable that the controller recognize which time in the video stream is the same as the time in the audio stream for which the words "Pi" and "one hundred" were stated in a most efficient manner. An advantage of the MPEG format is that the time relationship between the audio and video streams are maintained. However, other data formats are sufficient.

The controller 406 can be configured to generate a data set including combined dictation from the first dictation and the second dictation. The interface 404 can add formatting information to the data set to generate the data packets to be sent to the mobile station by the transceiver 402 via a connection to a network such as the Internet.

Exemplary processes for generating the combined dictation are discussed in the following flow diagrams. Each of the flow diagrams will be discussed with respect to the mobile station 300 and server end device 400.

Figure 5A:
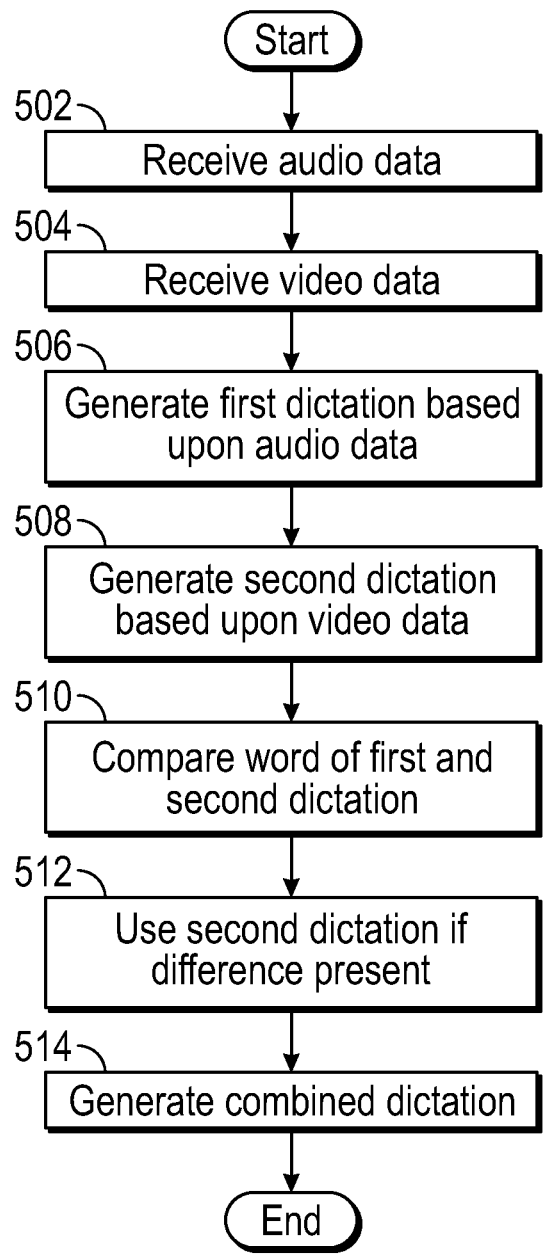
FIG. 5A is a flow diagram illustrating exemplary operations of the system according to an exemplary embodiment.

Referring to the exemplary flow diagram of FIG. 5A, an exemplary process for performing speech-to-text according to a first embodiment will be discussed. In this first embodiment, both audio and video-based recognition is used, and a combined dictation is generated based upon a comparison between each of the words of the first and second dictations.

At 502, the audio input device 314 receives an audio signal representing a voice utterance of one or more words. At 504, the video input device 316 receives video of lip motion during the voice utterance. Although described as separate steps, 502 and 504 may and likely occur simultaneously. The controller 306 and interface 304 generate first data packets including an audio stream representative of the voice utterance and a video stream representative of the lip motion. As mentioned above, the data packets may include an MPEG stream. The transceiver 302 sends the first data packets to the server end device 400.

At 506, the audio based recognition module 410 performs an audio based speech recognition algorithm to convert the voice utterance in the audio stream into first dictation. At 508, the video based speech recognition module performs a video based speech recognition algorithm to convert the video stream into second dictation. Although not shown, prior to 506 the controller 406 and interface 404 can extract the audio and video streams from the first data packets and pass them to modules 410, 412. Each of the first and second dictations is a textual representation of the words in the voice utterance.

At 510, the controller 406 determines if each of the words in the first dictation has a predetermined characteristic. Particularly, the controller 406 compares the word of the first dictation with the corresponding word of the second dictation to determine if they are different. At 512, if a word of the first dictation is different from the corresponding word of the second dictation, the word of the second dictation is chosen for the combined dictation. For example, as shown in FIG. 1C, word 121, word 122, word 124, word 125 and word 126 of first dictation 12 are same as corresponding word 161, word 162, word 164, word 165 and word 166 of second dictation 16. Word 123 "Fi" is different from word 163 "Pi". Thus, in the combined dictation, the word 123 in the first dictation is replaced by word 163, or only second dictation 16 is used.

At 514, the controller 406 generates combined dictation, in which each word in the first dictation having the first characteristic has been corrected by corresponding word in the second dictation. The controller 406 and interface 404 can generate second data packets including the combined dictation to be sent by the transceiver 402 to the mobile station 300. The controller 306 can render the combined dictation as text on the display 320 and/or send the second data packets as input to a downstream application such as an Internet website or a control command to other devices such as a television or other home appliance.

As discussed above, at 512 only the word in the first dictation which was different was replaced with the corresponding word of the second dictation. However, alternatively, all of the words in the first dictation can be replaced with the second dictation.

Referring to the exemplary flow diagram of FIG. 5B, an exemplary process for performing speech-to-text according to a second embodiment will be discussed. At 520, the audio input device 314 receives input speech (voice utterance). If the input speech is analog data, the audio input device 314 and processor 318 can convert the analog voice data into digital data and (together with controller 306) generate an audio stream including the input speech. The controller 306 and interface 304 generate first data packets including an audio stream representative of the voice utterance. The transceiver 302 sends the first data packets to the server end device 400.

At 521, the audio based recognition module 410 performs the audio based speech recognition algorithm to convert the voice utterance in the audio stream into first dictation. At 522, the controller 406 analyzes each word of the first dictation to determine if it has a predetermined characteristic. For example, here it can be determined if the word is shorter than a predetermined time or includes less than a predetermined number of syllables. Such shorter words may have a higher error rate when used by voice based recognition services to generate speech. The end of a word or the number of syllables can be determined by extracting a feature signal of each word.

If a word is determined to not have the predetermined characteristic (NO at 522), only the first dictation is use. On the other hand, when the word is determined to have the predetermined characteristic (YES at 522), at 524 the portion of the video stream corresponding to this portion of the audio stream (the previous Y time units) is input to the video based recognition module 412. The previous Y time units should be greater than or equal to the X time units of the corresponding audio stream. If the audio and video streams are MPEG stream, the synchronization data for synchronizing the audio and video streams can be used. The Y time units of the video stream can be obtained by, for example, sending a request message requesting the specific units to the mobile station 300 and receiving further data packets including the Y time units in a reply message. Alternatively, the video stream can be included in the first data packets and stored in the memory 408 or other memory.

At 526, the video based recognition module 412 performs the video based recognition algorithm (lip reading) on the corresponding video data to generate second dictation. At 528, either the second dictation for the entire stream is used in place of the first dictation, or the second dictation generated from the video stream is merged with that of the audio stream to generate combined dictation. For example, when a word by word approach is used for speech-to-text, the high probability candidate words generated by the voice-based approach can be combined with the word generated by the video-based approach. Alternatively, a text for an entire sentence can be generated by the video-based approach.

As discussed above, the first dictation was generated at 521 prior analyzing each word to determine if it has a predetermined characteristic. Alternatively, the word can be analyzed prior to generating the first dictation by, for example, performing an energy analysis of the audio frame of the stream.

Figure 6:
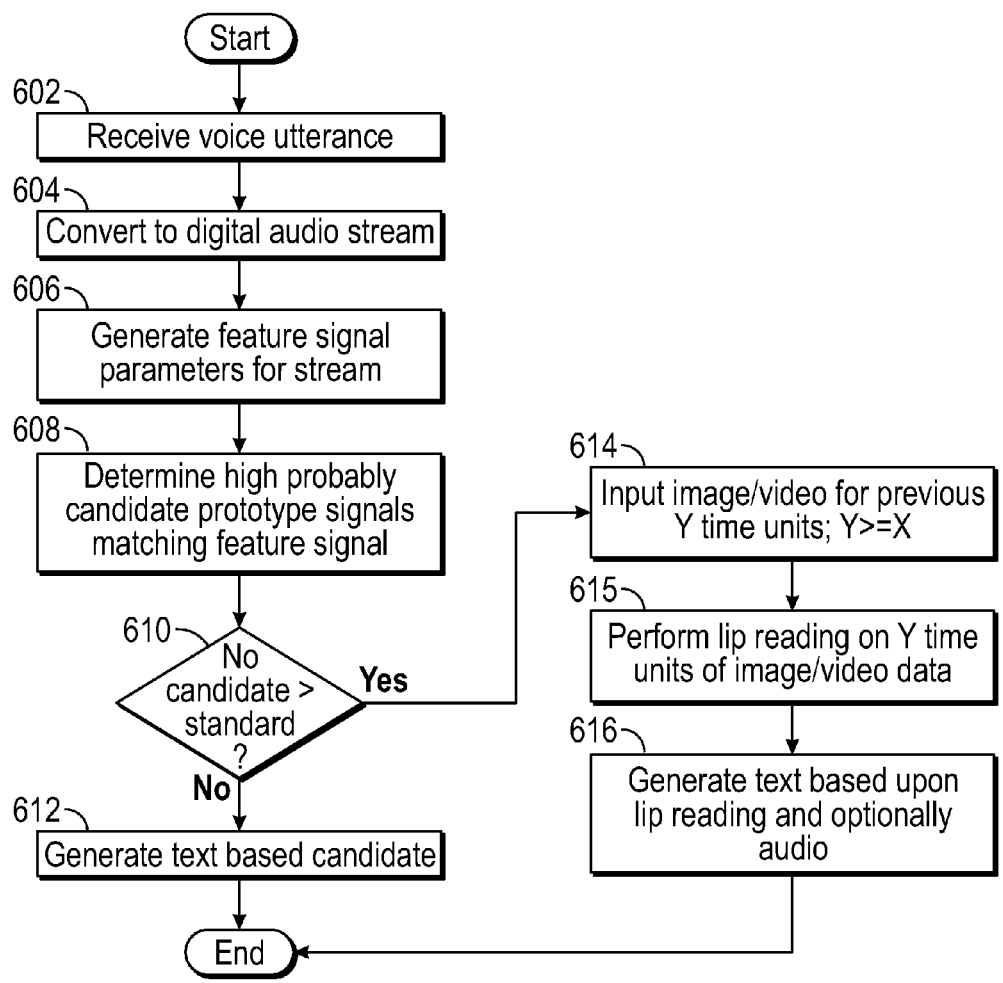
FIG. 6 is a flow diagram illustrating exemplary operations of the system according to an exemplary embodiment.

Referring to the exemplary flow diagram of FIG. 6, an exemplary process for performing speech-to-text according to a third embodiment will be discussed. In this example, a criteria for using audio or video-based recognition is based upon probability model calculations such as, for example, the Hidden Markov Model (HMM) Speech Recognition discussed above.

At 602, the audio input device 314 receives input speech (voice utterance). At 604, the audio input device 314 (or the controller 306 operating a program stored in memory 308) converts the analog voice data into digital data and forms an audio stream including the input speech.

At 606, the audio based recognition module 410 extracts the input speech pattern from the audio stream and generates a sequence of acoustic feature signal parameters based upon analysis of the input speech pattern. For example, each acoustic feature can be a LPC coefficient features signal vector.

At 608, the audio based recognition module 410 compares the generated feature signal vectors to previously stored LPC feature signals to generate a sequence of vector quantized LPC signals representative of the input speech pattern.

At 610 the probability of the quantized signal having been generated by a reference pattern model of a vocabulary set is determined. After the probability signal for each reference pattern model has been determined, the input speech pattern may be identified as the candidate reference pattern model corresponding to the highest probability signal. If a candidate reference pattern model with suitable probability is determined (YES at 610), at 612 the text for the portion of the audio stream is generated based upon the voice data (first dictation) from the candidate. That is, the word associated with the candidate reference pattern module is chosen as the word in the first dictation.

In the distributed device format in which the voice speech-to-text recognition module 414 is implemented at the server end device 400, the audio stream must first be communicated to the server end device 400. The interface 304 can generate a message including the audio stream such as a MAC frame message as discussed above to be sent by the transceiver 302. The transceiver 402 of the server end device 400 receives the message including the audio stream. The interface 404 (or the processor 406) can extract the audio stream from the message and the audio based recognition module 410 can determine the candidate reference pattern model with suitable probability. In the single device format in which the voice speech-to-text recognition module is implemented in the controller 306 of the mobile station 300, the digital voice stream can be sent to the controller 306 via the bus 312.

Returning to 608, there will be cases when no candidate reference pattern model with suitable probability can be determined (NO at 610). For example, under the conventional HMM speech recognition approach, the prototype signal with the highest probability is chosen. However, here if no prototype signal has a probability greater than a predetermined standard such as, for example, 90%, the portion of the video stream corresponding to this portion of the audio stream (the previous Y time units) is input to the video based recognition module 412. The previous Y time units should be greater than or equal to the X time units of the corresponding audio stream. If the audio and video streams are MPEG stream, the synchronization data for synchronizing the audio and video streams can be used. At 615, the video based speech recognition module is used to perform speech-to-text based upon the Y time units of the video of the speaker (lip reading). At 616, either the second dictation for the entire portion of the video corresponding to the audio stream is generated based upon the video stream, or the second dictation generated from the video stream is merged with that of the audio stream (combined dictation). For example, if a word by word approach is used for speech-to-text, the high probability candidate words generated by the voice-based approach can be combined with the word generated by the video-based approach. Alternatively, a text for an entire sentence can be generated by the video-based approach.

Figure 5B:
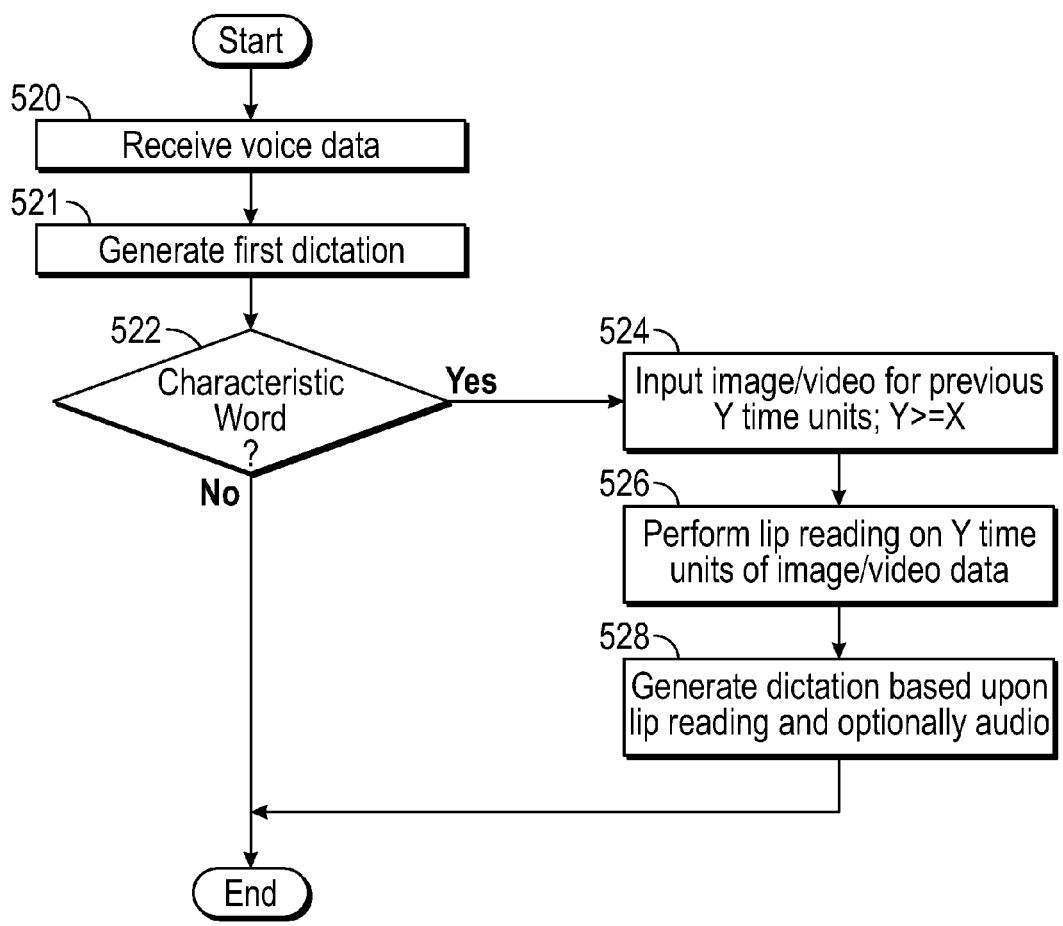
FIG. 5B is a flow diagram illustrating exemplary operations of the system according to an exemplary embodiment.

Returning to the flow diagram of FIG. 5B, in this example the characteristic word was determined after audio-based recognition being performed. For example, the characteristic word could be determined based upon the prototype candidate signal. If the prototype candidate signal corresponded to a word having less than a predetermined number of syllables or a predetermined length or time duration, the flow diagram could proceed to 524. Further, the decision to proceed to 524 could be decided based upon a combination of if the word is a characteristic word and the probability of the prototype signal (step 610). Particularly, the standard for probability could be lowered for non-characteristic words and can be higher for characteristic words. Further, FIGS. 5B and 6 show the video based processing only being performed in response to the decisions at 522 and 610. However, video based speech-to-text recognition may be being performed in parallel with voice based speech-to-text recognition similar to FIG. 5A discussed above and FIG. 8A discussed later. However, the processes of FIGS. 5B and 6 have the advantage of limiting unnecessary processing consumption associated with the video based recognition.

Referring to the exemplary flow diagram of FIG. 7, an exemplary video based speech recognition algorithm for performing speech-to-text will be discussed. At 702, the video stream is converted into a sequence of N image frames, each having a time duration T. The time durations T may be equal, or may be set for each word of the utterance. The mouth region can be cropped in each frame. At 704, a feature signal parameter sequence is generated from the sequence of image frames. For example, a local binary pattern (LBP) operator can be used to generate a feature signal vector. At 706, the feature signal vector is matched to a stored feature signal parameter sequence. At 708, the probability of each of a plurality of candidate prototype words generating the stored feature vector is determined. At 710, the candidate prototype word of the highest probability is selected, and the text (second dictation) for the candidate prototype word is generated. The video based recognition module 412 can be configured according to instructions in memory to perform the video based speech recognition algorithm.

Figure 8A:
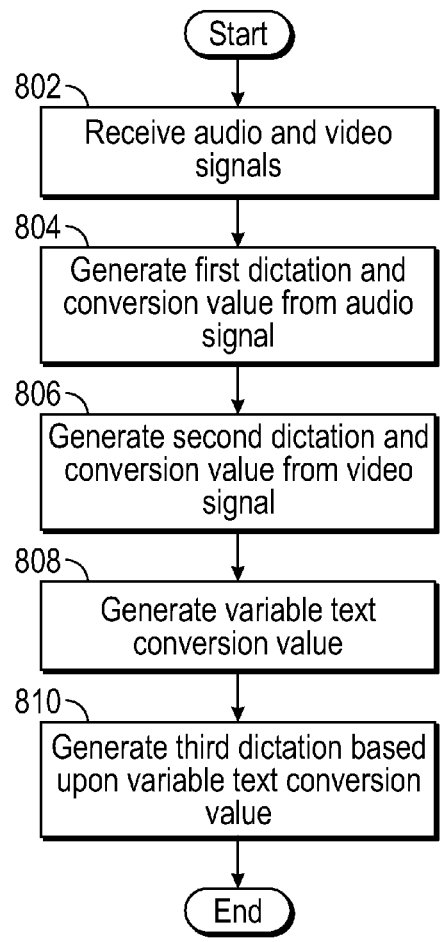
FIG. 8A is a flow diagram illustrating exemplary operations of the system according to an exemplary embodiment.

Referring to the exemplary flow diagram of FIG. 8A, an exemplary process for performing speech-to-text in accordance with a fourth embodiment will be discussed.

At 802, the audio input device 314 receives an audio signal representing the user voice and the video input device 316 receives a video signal representative of lip movement associated with the user voice. The audio and video signals can be analog or digital signals. The audio signals are converted into audio streams including a sequence of frames representing the voice utterance. The video signals are converted into video streams including a sequence of image frames representing lip motion associated with the voice utterance as shown in FIG. 1B.

Figure 8B:
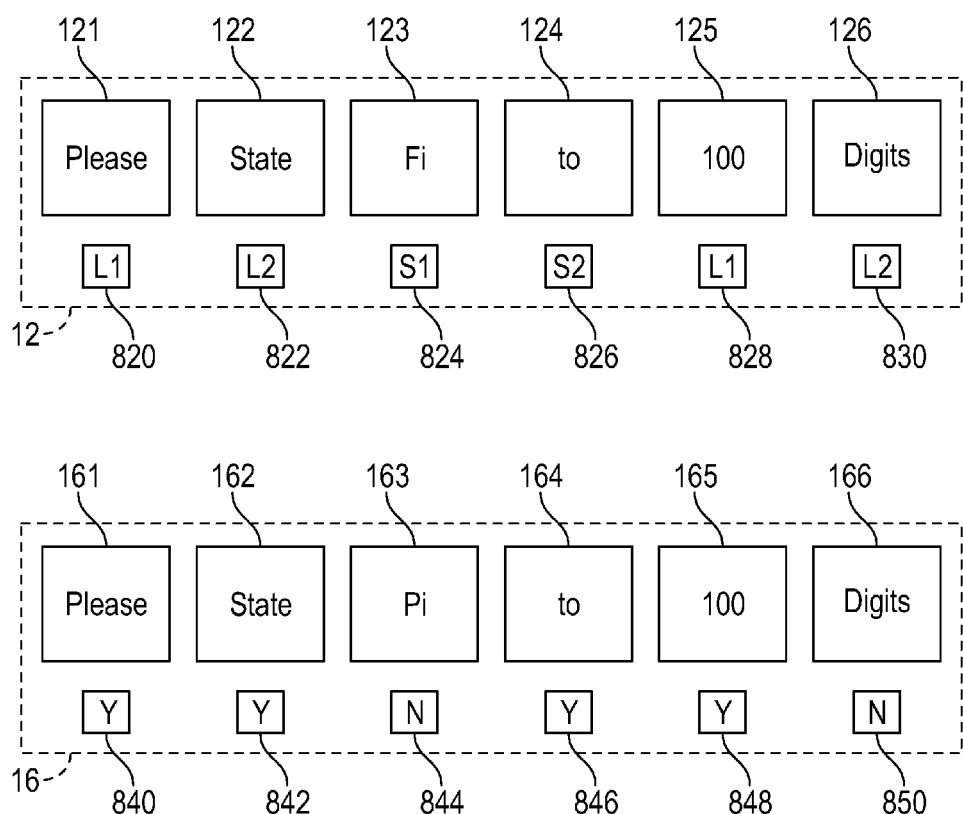
FIG. 8B is a schematic diagram illustrating first and second dictations generated by the dictation device.

At 804, the audio based recognition module 410 generates a first dictation based on the audio signal. The controller 406 assigns a first conversion value based on a first set of conversion criteria. Referring to FIG. 8B, the controller 406 assigned first conversion values 820, 822, 824, 826, 828, 830 based upon whether the words are long (L) or short (S) as the conversion criteria.

At 806, the video based recognition module 412 generates a second dictation based on the video data. The controller 406 assigns a second conversion value based on a second set of conversion criteria. Referring to FIG. 8B, the controller 406 assigned second conversion values 840, 842, 844, 846, 848, 850 based upon whether the words are different from corresponding words of the first dictation (Y or N).

Figure 7:
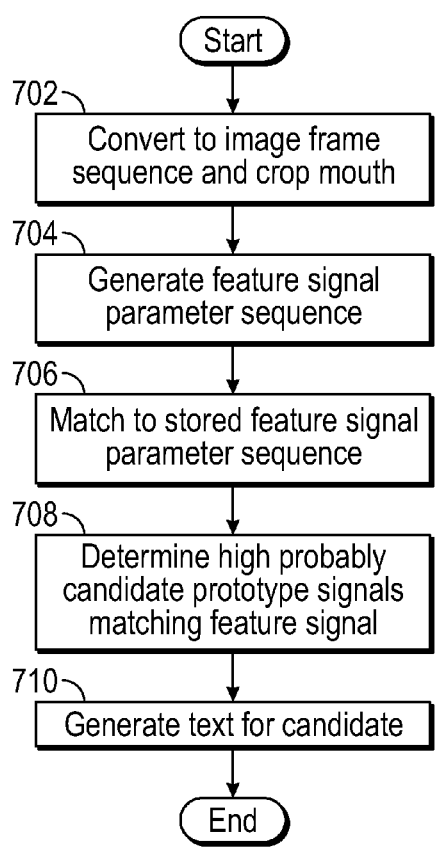
FIG. 7 is a flow diagram illustrating an exemplary process for performing speech-to-text based upon images representing lip motion.

The first and second dictations can be generated based upon known subject dependent (SD) and subject independent (SI) voice based and lip motion based speech to text algorithm such as discussed above in FIG. 6 (steps 602-612) and FIG. 7.

At 808, the controller 406 generates a variable text conversion value based on the first conversion value and the second conversion value. Generally, the variable text conversion value can be one or more rules for determining whether to use a word or words of the first dictation or the second dictation. In FIG. 8B, the variable text conversion value is to use the second dictation when a length of a word of the first dictation is greater than a predetermined time duration.

However, other rules or a combination thereof may be used as the variable text conversion value. Example rules include: (1) use the second dictation when a number of syllables in a word of the first dictation is not greater than N; (2) use the second dictation when a signal to noise ratio between the audio signal and background noise is not below a predetermined threshold; (3) use the first dictation when a signal to brightness ratio is above a predetermined threshold; (4) use the second dictation when the volume of the audio signal is lower than a predetermined value; (5) use the first dictation when video input device detects no lip movement; and (6) use the first dictation for certain Global Positioning Satellite (GPS) data.

The signal to noise data and signal to brightness data can be obtained by the audio input device 314 and the video input device 316 together with the controller 306. Particularly, this data can be included in the first data packets sent by the transceiver 302 to the server end device 400. Alternatively, the controller 406, audio based recognition module 410 and video based recognition module 412 at the server end device 400 can be configured to determine the signal to noise value of the audio stream and the signal to brightness value of the video stream. The GPS data can be determined by the mobile station 300 and included in the first data packets sent by the transceiver 302. Particularly, the controller 306 of the mobile station 300 can utilize the transceiver 302 and/or an associated base station (not shown) for obtaining the GPS data.

At 810, the controller 406 generates a third dictation based on the variable text conversion value. Returning to FIG. 8B, the third dictation can include only the words of the second dictation, or the words of the first dictation except for word 123 which is replaced with word 163.

The first and second conversion values can be, for example, an evaluation value that increases along a probability that a produced word is a corresponding keyword as the conversion criteria.

As the evaluation value, for example, confidence measure used at the time of determining whether a voice included in the voice data and lip motion associated with the voice data and obtained by publicly known voice and video recognition processes, coincide with a corresponding keyword may be adopted. The confidence measure may be calculated based on a posterior probability in a hidden Markov model (HMM) or a likelihood (an acoustic likelihood or a linguistic likelihood) obtained by voice and video recognition processing. In this case, the dictation device previously stores an acoustic model, an LBP model, a dictionary, and a language model, which relate to the above mentioned keywords, and performs the voice and video recognition processes with reference to this information, thereby calculating the above-mentioned conversion values.

Alternatively, the conversion values may be obtained from, for example, similarity of distances calculated between the pieces of voice data of the preliminarily registered keywords and the input voice data may be adopted. The similarity may be calculated by calculating distances between pieces of voice data using, for example, a publicly known distance calculation method that utilizes a predetermined sound feature quantity such as a spectrum and by performing dynamic programming (DP) matching in a voice interval. In this case, the dictation device preliminarily stores therein the pieces of voice data or the sound feature quantities of the above-mentioned keywords.

The first and second sets of conversion criteria can include pre-registered data representing a value associated with the user voice or lip motion such as in a SD recognition system. As discussed above, in the SD voice based system, the reference pattern models and/or predetermined feature signals may have been generated based upon a user speaking a training sequence. Similarly, in the SD lip reading services, the user inputs a training sample size so that the service can "learn" the user's unique characteristics.

The controller can be configured to prioritize either the first conversion value or the second conversion value by a predetermined setting assigned by a user. For example, when the mobile station is in a very noisy location, it may be best to use the second dictation. In this case, the user can manually set the mobile station to use only the second dictation. Alternatively, the mobile station can be set to only use the first or second dictation when the mobile station is determined to be at a certain location. The mobile station can be configured to receive global positioning system (GPS) data so that the location can be determined. Alternatively, the controller can generates the variable text conversion value based on the GPS data as well as the first and second conversion values.

As discussed above, one rule associated with the variable text conversion value can be a signal to noise ratio between the audio signal and a background noise is below a predetermined threshold. In this case, the controller can be configured to disable the audio input device.

As discussed above, one rule associated with the variable text conversion value can be a signal to brightness ratio is below a predetermined threshold. In this case, the controller can be configured to disable the video input device.

As discussed above, one rule associated with the variable text conversion value can be the video input device detects no lip movement. In this case, the controller can be configured to disable the audio input device.

Figure 9:
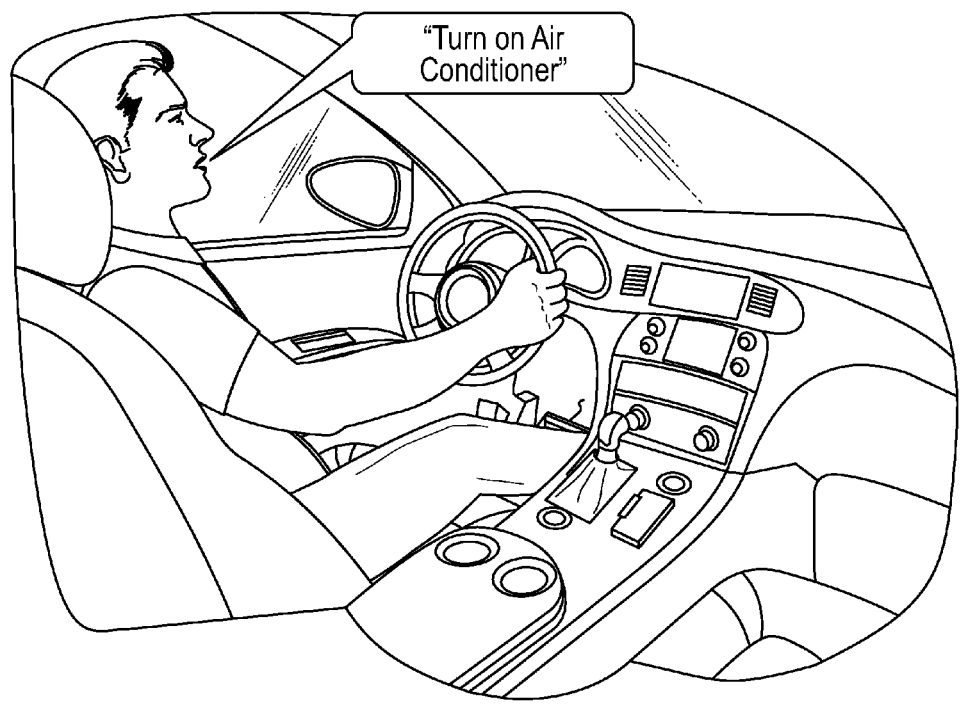
FIG. 9 is a schematic illustration of a voice commanded vehicle system incorporating the dictation device and system.

The dictation generated by the speech-to-text services of the various embodiments can be passed to another machine for as a command data or control data to achieve voice based navigation or control. For example, as shown in FIG. 9, the dictation device of the various embodiment can be incorporated in a control system for vehicle components. A voice utterance: "Turn on Air Conditioner" is converted to dictation as discussed in the above embodiments. The controller can activate the air conditioning system based upon the dictation. Other vehicle components such as the radio, vehicle navigation system, windshield wiper, etc. can be controlled based upon the dictation. In such cases, although the speech is converted into dictation, those skilled in the art will appreciate that the dictation will only be represented in machine code or the like recognizable by the controller. Alternatively, the dictation device of the various embodiments can be incorporated into home appliances such as a television. Voice speech of commands such as to change the channel, activate or deactivate the television, etc. can be converted into dictation to perform control of the television in accordance with the command.

Other embodiments will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A dictation device comprising:
    an audio input device configured to receive a voice utterance including a plurality of words;
    a video input device configured to receive video of lip motion during the voice utterance;
    a memory portion;
    a controller configured according to instructions in the memory portion to generate first data packets including an audio stream representative of the voice utterance and a video stream representative of the lip motion; and
    a transceiver for sending the first data packets to a remote apparatus and receiving second data packets including combined dictation based upon the audio stream and the video stream from the remote apparatus,
    wherein in the combined dictation, at least one word in first dictation generated based upon the audio stream which has a predetermined characteristic has been corrected by second dictation generated based upon the video stream,
    wherein the controller is further configured to permit a user to select (i) enabling both of the audio input device and the video input device; (ii) disabling, only the audio input device; and (iii) disabling only the video input device, and
    wherein the first data packets further include global positioning system (GPS) data associated with the dictation device, and the dictation device is set to use the first dictation or the second dictation based on the GPS data.

2. The dictation device of claim 1, further comprising a display, wherein the controller is further configured to render the combined dictation as text on the display.

3. The dictation device of claim 1, wherein the transceiver is further configured to send the second data packets to a downstream application.

4. The dictation device of claim 1, wherein the predetermined characteristic is the at least one word has four or less syllables and is less than a predetermined length or time duration.

5. A server end device comprising:
a transceiver configured to receive first data packets from and send second data packets to a remote mobile station via a connection to a network, the received first data packets including an audio stream and a video stream associated with a voice utterance of a plurality of words;
a controller coupled to the transceiver;
an audio based speech recognition device coupled to the controller and configured to generate first dictation based upon the audio stream received from the remote mobile station;
a video based speech recognition device coupled to the controller and configured to generate second dictation based upon the video stream received from the remote mobile station; and
a memory including instructions for configuring the controller to generate a combined dictation based upon a comparison between the first dictation and the second dictation and include the combined dictation in the second data packets to be sent,
wherein the controller is further configured to:
determine if at least one of the words in the first dictation has a predetermined characteristic; and
generate the combined dictation based upon the second dictation for the at least one of the words having the predetermined characteristic and based upon the first dictation for the other of the plurality of words,
wherein the audio stream and the video stream are combined into an Moving Picture Experts Group (MPEG) stream according to an MPEG format,
wherein synchronization data of the MPEG stream is used to determine a portion of the video stream that corresponds to the at least one of the words having the predetermined characteristic, and
wherein the first data packets include global positioning system (GPS) data associated with the remote mobile station, and the server end device is set to use the first dictation or the second dictation based on the GPS data.

6. The server end device of claim 5, wherein the predetermined characteristic is that the at least one word is not similar to the corresponding at least one word in the second dictation.

7. The server end device of claim 5, wherein the predetermined characteristic is further the at least one word has four or less syllables.

8. The server end device of claim 5, wherein the audio based speech recognition device generates the first dictation by:
extracting a feature signal associated with the audio stream;
for each of a plurality of candidate prototype words, determining a probability that the respective candidate prototype word generates the feature signal; and
choosing the candidate prototype word having highest probability among the plurality of candidate prototype words,
wherein the predetermined characteristic is that the probability associated with the chosen candidate prototype word is less than a predetermined standard.

9. A system for performing speech-to-text services comprising:
the server end device of claim 5,
wherein the remote mobile station includes:
an audio input device configured to receive the voice utterance including the plurality of words;
a video input device configured to receive video of lip motion during the voice utterance;
a memory portion;
a controller configured according to instructions in the memory portion to generate first data packets including the audio stream which is representative of the voice utterance and the video stream which is representative of the lip motion; and
a transceiver for sending the first data packets to the server end device and receiving second data packets including the combined dictation from the server end device,
wherein the controller is further configured to permit a user to select (i) enabling both of the audio input device and the video input device; (ii) disabling only the audio input device; and (iii) disabling only the video input device.

10. The server end device of claim 5, wherein the video based speech recognition device generates the second dictation based upon the video stream by:
extracting a sequence of image frames from a predetermined portion of the video stream;
generating a local binary pattern (LBP) from a series of images;
matching the LBP to a feature signal vector stored in the memory;
determining a probability for each of a plurality of candidate prototype words generating the feature signal vector;
selecting a candidate prototype word of the plurality of candidate prototype words of highest probability to be the second dictation.

11. A dictation device for generating text based on a voice utterance and lip movement associated with the voice utterance, comprising:
an audio input device that receives an audio signal representing the voice utterance;
a video input device that receives a video signal representative of the lip movement;
a controller configured according to instructions stored in a memory, the controller configured to:
combine the audio signal and the video signal into an Moving Picture Experts Group (MPEG) stream according to an MPEG format,
generate a first dictation based on the audio signal and assign a first conversion value based on a first set of conversion criteria;
generate a second dictation based on the video signal and assign a second conversion value based on a second set of conversion criteria; and
generate a variable text conversion value based on the first conversion value and the second conversion value and generate a third dictation based on the variable text conversion value;

wherein the controller is configured to prioritize either the first conversion value or the second conversion value by a predetermined setting assigned by a user, and wherein the controller uses synchronisation data of the MPEG stream to determine a portion of the video signal that corresponds to a portion of the audio signal when generating the third dictation, and determine a global positioning system (GPS) data associated with the dictation device, and the dictation device is set to use the first dictation or the second dictation based on the GPS data.

12. The dictation device of claim 11, wherein:
the audio input device is disabled when a signal to noise ratio between the audio signal and a background noise is below a predetermined threshold; and
the video input device is disabled when a signal to brightness ratio is below a predetermined threshold.

13. The dictation device of claim 11, wherein if a volume of the audio signal is lower than a predetermined value, the controller generates the variable text conversion value without the first conversion value.

14. The dictation device of claim 11, wherein when the video input device detects no lip movement, the audio input device is disabled.

15. The dictation device of claim 11, wherein the controller generates the variable text conversion value based on global positioning system (GPS) data.

16. The dictation device of claim 11, wherein:
the first set of conversion criteria includes pre-registered data representing a value associated with the user voice; and
the second set of conversion criteria includes pre-registered data representing a value associated with the user voice.

17. The dictation device of claim 11, wherein the variable text conversion value is generated based on a predetermined criteria which includes pre-registered data representing a value of the user voice.

18. The dictation device of claim 11, wherein the predetermined setting can be assigned by a user.

* * * * *